United States Patent [19]
Nguyen et al.

[11] Patent Number: 5,639,496
[45] Date of Patent: Jun. 17, 1997

[54] FOOD INGREDIENTS OBTAINED BY FERMENTATION WITH S. BOULARDII AND FOODS CONTAINING THEM

[75] Inventors: Tan Hung Nguyen, Saint-Ave; Maryse Herve, Vannes, both of France

[73] Assignee: Societe Anonyme Guyomarc'h Alimentaire - S.A.G.A.L., Elven, France

[21] Appl. No.: 273,591

[22] Filed: Jul. 11, 1994

[51] Int. Cl.$^6$ ................ A23L 1/20; A23B 9/28; A23B 7/155
[52] U.S. Cl. .................. 426/62; 426/2; 426/46; 426/52; 435/255.2
[58] Field of Search ...................... 426/62, 2, 46, 426/52; 435/255.2

[56] References Cited

U.S. PATENT DOCUMENTS

| | | | |
|---|---|---|---|
| 1,898,057 | 2/1933 | Kish | 426/62 |
| 2,313,275 | 3/1943 | Schopmeyer | 426/62 |
| 3,051,576 | 8/1962 | Lendvai | 426/62 |
| 3,278,312 | 10/1966 | Griffon et al. | 426/62 |
| 3,627,539 | 12/1971 | Ishii et al. | 426/62 |
| 4,053,582 | 10/1977 | Stickl | 424/89 |
| 4,582,708 | 4/1986 | Tipton et al. | 426/62 |
| 4,595,590 | 6/1986 | Hublot et al. | 424/93 |
| 4,643,897 | 2/1987 | Gayral et al. | 424/93 |
| 5,047,250 | 9/1991 | Prieels et al. | 426/62 |

FOREIGN PATENT DOCUMENTS

| | | | |
|---|---|---|---|
| 3101546 | 9/1978 | Japan | 426/62 |
| 1709977 | 2/1992 | U.S.S.R. | 426/62 |
| 1003188 | 9/1965 | United Kingdom . | |

OTHER PUBLICATIONS

DeManeilha et al Biotechnol. Bioeng., 26(6) 632–634 (1984).

(Robe) Robert + Carriere Lab Sa, 66–18630F WPIDS, FR 3501, Aug. 1993, abstract only.

Castex et al, 90(11):C0055 FSTA, Journal of General Microbiology, (1990) 136(6) 1085–1089, abstract only.

(Sero–N) Lab Serozym, 75–43079W WPIDS, FR 2244464A, abstract only.

Primary Examiner—Esther Kepplinger
Assistant Examiner—Choon P. Koh
Attorney, Agent, or Firm—Dressler, Rockey, Milnamow & Katz, Ltd.

[57] ABSTRACT

The invention relates to food ingredients obtained by fermentation of raw materials of vegetable origin with *Saccharomyces boulardii* yeast, and to foods containing them.

2 Claims, No Drawings

FOOD INGREDIENTS OBTAINED BY FERMENTATION WITH S. BOULARDII AND FOODS CONTAINING THEM

FIELD OF THE INVENTION

The invention relates to food ingredients obtained by fermentation with Saccharomyces boulardii yeast and to foods containing them.

BACKGROUND OF THE INVENTION

Yeasts of the genus Saccharomyces are commonly used in many agricultural food industries.

Nevertheless, each agricultural food industry utilizes Saccharomyces species in a very specialized manner for the production of fermented foods or drinks.

Thus, S. cerevisiae is used in bakery.

S. cerevisiae, S. carlsbergensis or S. uvarumare yeasts employed in beer production. S. uvarum is also used in cider making.

S. cerevisiae var. ellipsoideus, S. beticus and S. bayanus are well-known yeasts for wine fermentation.

S. rouxii is employed in the manufacture of soya sauces and also for rice miso.

S. boulardii is a yeast which was isolated from lychee fruits from Indochina back in the 1920s. Since 1962, S. boulardii has been used in Europe and other countries as a probiotic medicinal product having an antidiarrhoeal effect in man. Thus, S. boulardii forms the active principle of the pharmaceutical speciality Ultra-Levure, trade name of Laboratoires Biocodex (92 126—Montrouge, France).

Several patents teach us that S. boulardii is an effective medicinal product against some diseases of man: EP-A-0,149,579 and U.S. Pat. No. 4,595,590 for pseudomembranous colitis, EP-A-0,195,870 and U.S. Pat. No. 4,643,897 for amoebiasis.

S. boulardii has never been used in the production of fermented foods or drinks.

SUMMARY OF THE INVENTION

Now, we have discovered that S. boulardii can be used profitably for producing fermented foods and food ingredients, by fermentation of vegetable raw materials containing carbohydrates and proteins.

The non-limiting examples which follow will illustrate the invention.

In these examples, simple foods are fermented after receiving an inoculum containing S. boulardii. The inoculum may be produced by any known technique of yeast culture.

It is possible, for example, to produce the inoculum in the following manner:

500 ml of a culture medium containing 10 g of malt, 1 g of maltose, 1 g of commercial yeast extract (Bio Mérieux, 69260 Charbonnières-les-Bains, France) and 500 ml of distilled water are introduced into a flask. The flask is closed with a stopper having two Pasteur pipettes inserted through it, after which the assembly is sterilized at 120° C. for 10 minutes. After cooling to room temperature, the medium is inoculated with $2.5 \times 10^9$ live S. boulardii yeast cells. One of the two Pasteur pipettes is connected via its outer end to a tube leading to an aeration pump, and emits bubbles into the culture medium via its inner end. The other pipette does not dip into the culture medium and enables gases to be discharged. The assembly is then placed in an incubator at 37° C. After 48 hours, the culture containing S. boulardii is centrifuged at 4000 rpm for 5 minutes. The supernatant is removed and the pellet is taken up in 30 ml of distilled water. This suspension constitutes the inoculum. The concentration of the inoculum is, on average, $10^9$ yeast cells per milliliter.

DESCRIPTION OF THE PREFERRED EMBODIMENTS

EXAMPLE 1

The following products are introduced into a dough mill of capacity 2 liters having thermostated walls:

| | |
|---|---|
| Ground raw wheat | 1 kg |
| Protein hydrolysate (Keramine A, trade name of Bretagne Chimie Fine, 56140 - Pleucadeuc, France) | 50 ml |
| Glucose | 100 g |
| Water | 450 ml |
| Inoculum | 30 ml |

The temperature of the mill is adjusted to 37° C. The beater of the mill is rotated at 50 rpm for 15 minutes every hour. Water is added during the fermentation in order to maintain the relative humidity above 90% (the relative humidity is measured with a Thermoconstanter, trade name of Novasina A. G., Zurich, Switzerland, hygrometer).

After 48 hours of fermentation, the characteristics of the fermented wheat are analysed according to the analytical methods commonly used in the EEC. The wheat thus fermented is compared with the original raw wheat and with the raw wheat mixed with the ingredients, such as the protein hydrolysate, glucose and water, in the same proportions as those used for the fermentation.

The results show that S. boulardii has modified the organoleptic, physical and chemical characteristics of the wheat after fermentation:

| | Original raw wheat | Raw wheat + ingredients | Wheat fermented with S. boulardii |
|---|---|---|---|
| Odour of | Cereal | Cereal | Fresh bread |
| pH (1 g in 10 ml of demineralized water) | 6.30 | 6.20 | 5.45 |
| Dry matter (D.M.) (%) | 85.7 | 57.3 | 77.7 |
| Sucrose (% D.M.) | 1.2 | 1.4 | 0 |
| Proteins (% D.M.) | 13.6 | 13.7 | 15.0 |
| Live yeast cells/g D.M. | 0 | 0 | $3 \times 10^7$ |

EXAMPLE 2

In the same dough mill as in Example 1, adjusted to 37° C., the following products are mixed:

| | |
|---|---|
| Soya cake | 1 kg |
| Glucose | 100 g |
| Water | 300 ml |
| Inoculum | 30 ml |

The beater of the mill is rotated at 50 rpm for 15 minutes every hour for 36 hours.

Water is added regularly in order to maintain the relative humidity of the mixture at a level in the region of 90%.

After 36 hours, the analyses show that the fermentation with *S. boulardii* has modified the organoleptic, physical and chemical characteristics of the soya cake:

|  | Original soya cake | Fermented soya cake |
| --- | --- | --- |
| Odour of | Soya cake | Yeast pastry |
| pH (1 g in 10 ml of demineralized water) | 6.65 | 6.33 |
| Dry matter (D.M.) (%) | 86.6 | 58.4 |
| Starch (% D.M.) | 9.0 | 4.6 |
| Total sugars (% D.M.) | 10.2 | 2.6 |
| Sucrose (% D.M.) | 5.2 | 0 |
| Proteins (% D.M.) | 50.9 | 53.6 |
| Live yeast cells/g D.M. | 0 | $3.2 \times 10^7$ |

EXAMPLE 3

In the same dough mill as in the previous examples, adjusted to 37° C. the following products are mixed:

| Cereal (50% wheat/50% maize) flakes | 1 kg |
| --- | --- |
| Protein hydrolysate (Keramine A, trade name) | 50 ml |
| Glucose | 20 g |
| Water | 400 ml |
| Inoculum | 30 ml |

The beater is rotated at 50 rpm for 15 minutes every hour for 48 hours. Water is added regularly so as to maintain the relative humidity at 90%.

After 48 hours, it is found by analysis that fermentation with *S. boulardii* has modified the organoleptic, physical and chemical characteristics of the cereal flakes:

|  | Original cereal flakes | Fermented cereal flakes |
| --- | --- | --- |
| Odour | Neutral | of Fresh bread |
| pH (1 g in 10 ml of demineralized water) | 6.60 | 6.00 |
| Dry matter (D.M.) (%) | 88.7 | 60.0 |
| Proteins (% D.M.) | 13.0 | 15.1 |
| Sucrose (% D.M.) | 1.2 | 0 |
| Live yeast cells/g D.M. | 0 | $1.35 \times 10^8$ |

EXAMPLE 4

In the same dough mill as in the previous examples, thermostated at 37° C., the following products are mixed:

| Ground pea | 500 g |
| --- | --- |
| Glucose | 10 g |
| Yeast extract (BioMérieux) | 10 g |
| Water | 150 ml |
| Inoculum | 20 ml |

The beater of the mill is rotated at 50 rpm for 15 minutes every hour for 30 hours.

Water is added regularly in order to maintain the relative humidity of the mixture at a level in the region of 90%.

After the fermentation, the analyses show that *S. boulardii* has modified the organoleptic, physical and chemical characteristics of the pea:

|  | Original pea | Fermented pea |
| --- | --- | --- |
| Odour | of Bean | Slightly alcoholic |
| pH (1 g in 10 ml of demineralized water) | 6.48 | 5.21 |
| Dry matter (D.M.) (%) | 86.7 | 65.8 |
| Proteins (% D.M.) | 23.6 | 25.2 |
| Sucrose (% D.M.) | 2.2 | 0 |
| Live yeast cells/g D.M. | 0 | $2.29 \times 10^7$ |

EXAMPLE 5

In the same dough mill as in the previous examples, adjusted to 37° C., the following products are mixed:

| Cassava flour | 500 g |
| --- | --- |
| Glucose | 10 g |
| Yeast extract (BioMérieux) | 10 g |
| Water | 300 ml |
| Inoculum | 30 ml |

The beater of the mill is rotated at 50 rpm for 15 minutes every hour for 46 hours.

Water is added regularly so as to maintain the relative humidity of the mixture at a level in the region of 90%.

After the fermentation, the analyses show that *S. boulardii* has modified the organoleptic, physical and chemical characteristics of the cassava:

|  | Original cassava | Fermented cassava |
| --- | --- | --- |
| Odour | Neutral | Acidic |
| pH (1 g in 10 ml of demineralized water) | 6.40 | 4.60 |
| Dry matter (D.M.) (%) | 86.6 | 55.7 |
| Proteins (% D.M.) | 2.1 | 3.2 |
| Live yeast cells/g D.M. | 0 | $1.1 \times 10^8$ |

We claim:

1. A process of preparing food products comprising fermenting food ingredients with *Saccharomyces boulardii*, wherein the food ingredients are of vegetable origin selected from the group consisting of pea and soya.

2. A fermented food product produced in accordance with claim 1.

* * * * *